(12) United States Patent
Hui

(10) Patent No.: US 7,509,850 B1
(45) Date of Patent: Mar. 31, 2009

(54) VEHICLE PROTECTION DEVICE DIRECTLY FORMED ON INFLATION VALVE

(76) Inventor: David Hui, 10-1 Fl., No. 223, Nanking East Road, Sec. 5, Taipei (TW)

( * ) Notice: Subject to any disclaimer, the term of this patent is extended or adjusted under 35 U.S.C. 154(b) by 0 days.

(21) Appl. No.: 11/899,930

(22) Filed: Sep. 10, 2007

(51) Int. Cl.
*B60C 23/02* (2006.01)
(52) U.S. Cl. .................................... 73/146.8
(58) Field of Classification Search ............... 73/146.8, 73/146.5, 146; 15/105
See application file for complete search history.

(56) References Cited

U.S. PATENT DOCUMENTS

| | | | | |
|---|---|---|---|---|
| 5,035,137 A | * | 7/1991 | Burkard et al. | 73/146.5 |
| 5,333,342 A | * | 8/1994 | Huang | 15/105 |
| 7,278,306 B2 | * | 10/2007 | Baum | 73/146 |
| 7,395,702 B2 | * | 7/2008 | Qiu et al. | 73/146.8 |
| 2003/0015030 A1 | * | 1/2003 | Gabelmann | 73/146 |
| 2004/0050151 A1 | * | 3/2004 | Kojima | 73/146 |

* cited by examiner

*Primary Examiner*—Andre J Allen

(57) ABSTRACT

A vehicle protection device includes a wiper externally mounted on the wheel rim as fastened by an inflation valve fixed in the wheel rim, and a sensor holder engaged with the inflation valve and positioned inside the wheel rim for holding a tire pressure sensor within the wheel rim and within a tire; whereby the sensor will sense the tire pressure for safely monitoring the tire pressure; and the wiper will scrape the rain water (or snow) outwardly from the wheel for enhancing driving safety.

8 Claims, 3 Drawing Sheets

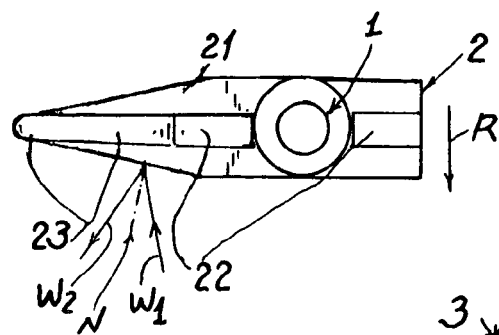
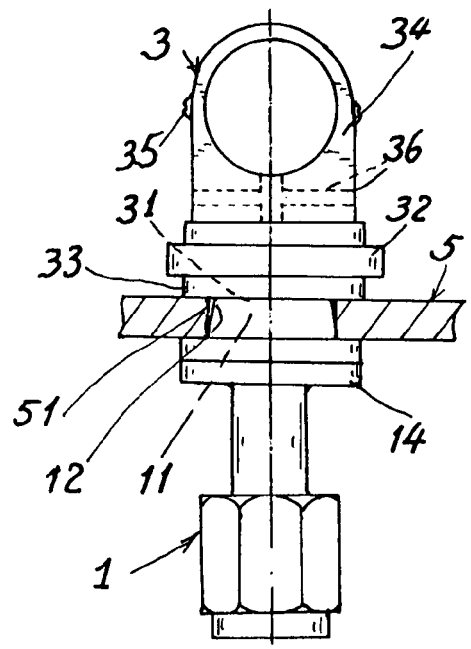
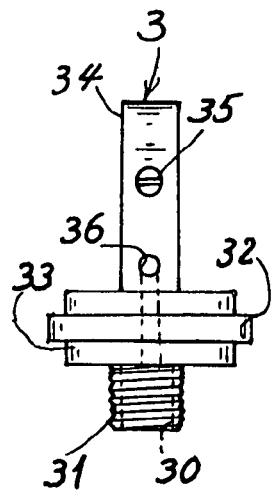
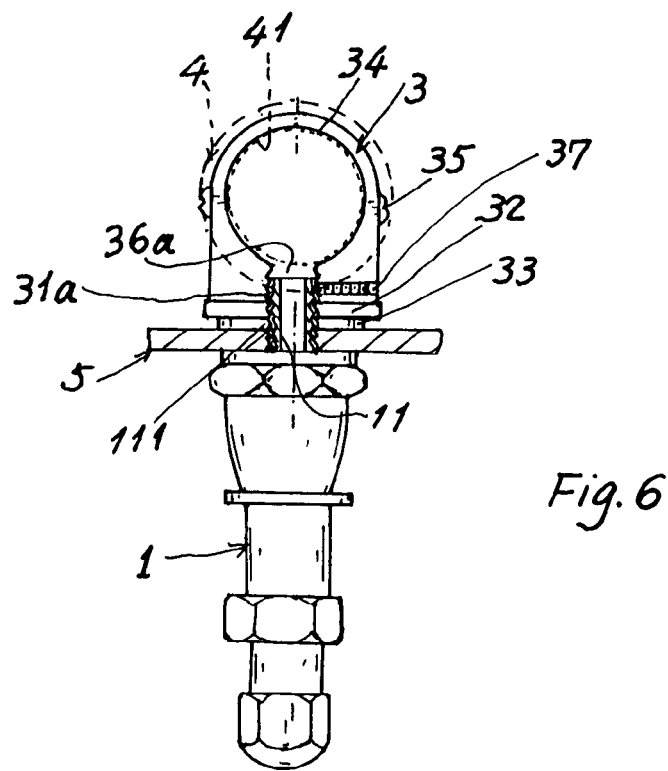

VEHICLE PROTECTION DEVICE DIRECTLY FORMED ON INFLATION VALVE

BACKGROUND OF THE INVENTION

For monitoring pressure in the tire of a motor vehicle wheel, a tire pressure sensor is disclosed in U.S. Pat. No. 5,035,137 by mounting the tire pressure sensor through a port in the wheel rim.

However, such a prior art has a drawback that the wheel rim should be further processed or formed with the port (such as a female-threaded hole) to install the sensor through the wall of the wheel rim, causing processing difficulty and increasing cost.

Meanwhile, a conventional wheel rim assembly may comprise several pieces, such as three pieces including a wheel disc, having convex and concave portion formed in the bore of the wheel rim. The concave portion or an annular groove recessed in the wheel rim may collect rain water or even snow in a cold weather to thereby influence a driving safety especially when running at a high speed.

The present inventor has found the drawbacks of the conventional vehicle wheel, and invented the present vehicle protection device.

SUMMARY OF THE INVENTION

The object of the present invention is to provide a vehicle protection device including a wiper externally mounted on the wheel rim as fastened by an inflation valve fixed in the wheel rim, and a sensor holder engaged with the inflation valve and positioned inside the wheel rim for holding a tire pressure sensor within the wheel rim and within a tire; whereby the sensor will sense the tire pressure for safely monitoring the tire pressure; and the wiper will scrape the rain water (or snow) outwardly from the wheel for enhancing driving safety.

BRIEF DESCRIPTION OF THE DRAWINGS

FIG. 3 is a bottom view of the present invention when viewed from FIG. 2.

FIG. 4 shows another modification of the present invention by eliminating the wiper.

FIG. 5 shows the sensor holder of the present invention as shown in FIG. 4.

FIG. 6 shows still another modification of the present invention as modified from the embodiment as shown in FIG. 4.

DETAILED DESCRIPTION

Figure 1:
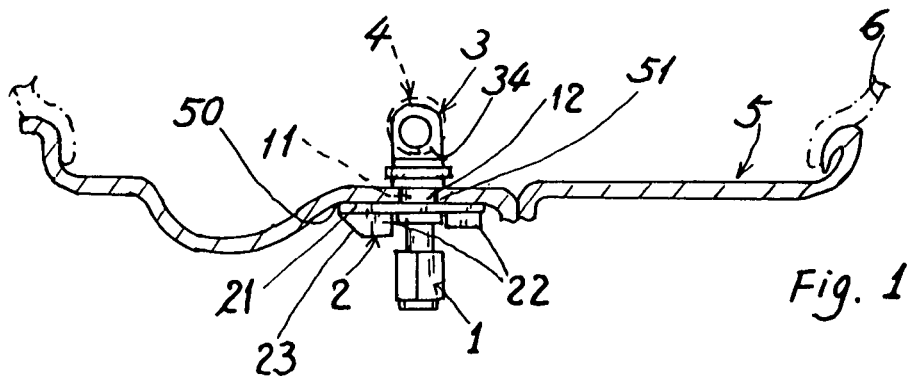
FIG. 1 is an illustration showing the protection device of the present invention mounted on a wheel rim.
Figure 2:
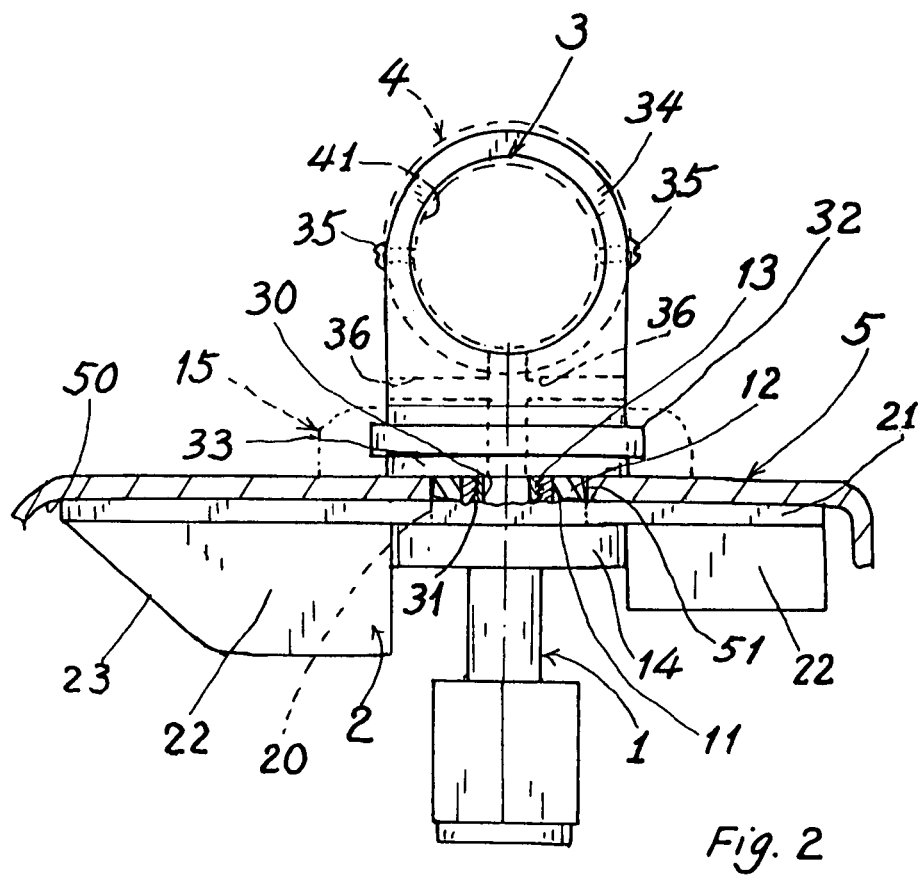
FIG. 2 is an enlarged view of the present invention as shown in FIG. 1.

As show in FIGS. 1~3, the present invention comprises: an inflation valve 1, a wiper 2 mounted on a wheel rim 5 as fastened with the inflation valve 1, and a sensor holder 3 for holding a tire pressure sensor 4 and positioned within the wheel rim 5 of a tire 6.

The wheel rim 5 may comprise three pieces or plural pieces (not limited) to be secured with a wheel disc thereon.

The inflation valve 1 includes: a connector 11 having a female-threaded hole 13 formed in the connector 11, a packing sleeve 12 jacketed on the connector 11 and fixed in a connector hole 51 formed through the wheel rim 5 for firmly mounting the connector 11 in the wheel rim 5, and a retainer disk 14 circumferentially integrally formed on the connector 11 for fastening the wiper 2 on the wheel rim 5.

The inflation valve 1 is provided for filling air into the tire 6 through the hole 13 formed in the valve 1.

The wiper 2 includes: a base 21 having a through hole 20 formed in the base 21 and engaged with (or integrally formed with) the packing sleeve 12 of the inflation valve 1 to be fastened by the retainer disk 14 to firmly retain the wiper 2 on the wheel rim 5, a scraper 22 protruding from the base 21 towards an axis of the wheel rim 5 for scraping rain water or snow accumulated in an annular groove 50 as recessed in the wheel rim 5, and a taper portion 23 tapered outwardly from the scraper 22 for thrusting the water (or snow) outwardly from the inflation valve 1 for enhancing the driving safety.

For example, when the rim and the wiper is rotated in direction R, the water W1 impacting on the tapered portion 23 as shown in FIG. 3 will be reflected about the normal line N to be thrusted outwardly in a direction W2, to repel the rain water (or snow) outwardly.

The sensor holder 3 includes: a male-threaded screw portion 31 having an inflating hole 30 longitudinally formed through the screw portion 31 and engaged with the female-threaded hole 13 formed in the inflation valve 1 for securing the sensor holder 3 to an inside wall of the wheel rim 5 within a tire 6, a nut 32 circumferentially formed with the screw portion 31 to be retained on the inside wall of the wheel rim 5 as packed by a packing member 33, a fastening ring 34 integrally formed on the nut 32 for fastening a sensor holding portion 41 of the tire pressure sensor 4 by at least a tiny screw 35, and an air opening 36 formed through the fastening ring 34 and fluidically communicated with the inflating hole 30 and communicated with the inflation valve 1 for directing air from the inflation valve 1 into an interior in the tire 6 and within the wheel rim 5 for sensing the tire pressure by the sensor 4.

If the sensor 3 is not required (or is dismantled for maintenance), a hollow retainer 15 may be provided for engaging the inflation valve 1 as dotted line shown in FIG. 2.

If the wiper 2 is not required, the sensor holder 3 may be directly secured to the inflation valve 1 as shown in FIGS. 4 and 5, in which the male-threaded screw portion 31 is directly engaged with the connector 11 of the inflation valve 1.

As shown in FIG. 6, the sensor holder 3 is modified to include: a nut 32 having a female-threaded hole 31a formed in the nut to be engaged with a male-threaded connector 11 of the inflation valve 1, a packing member 33 packed in between the nut 32 of the sensor holder 3 and an inside wall of the wheel rim 5 when the nut 32 is engaged with the connector 11 of the inflation valve 1, a fastening ring 34 integrally formed with the nut 32 for fastening a tire pressure sensor 4 in the fastening ring 34, and an air port 36a recessed in the fastening ring 4 and fluidically communicated with the inflation valve 1 for directing air into an interior in the tire and in the wheel rim 5 for sensing tire pressure by the sensor 4.

A male-threaded packing sleeve 111 is integrally formed on the male-threaded connector 11 of the inflation valve 1 for firmly engaging the female-threaded hole 31a formed in the nut 32 of the sensor holder 3.

Or, a set screw 37 is provided in the fastening ring 34 for firmly dogging the male-threaded connector 11 of the inflation valve 1.

Since the sensor holder 3 is directly secured to the inflation valve 1 within the wheel rim 5 and tire 6, there is no need to further drill or process a "fixing hole" for securing the sensor onto the wheel rim through such a "fixing hole".

So, the present invention provides a safety protection device including a tire pressure sensor and rain water (or snow) wiper directly formed on the inflation valve for simplifying assembly or production and also for reducing cost thereof.

The present invention may be further modified without departing from the spirit and scope of the present invention.

Figure 7:
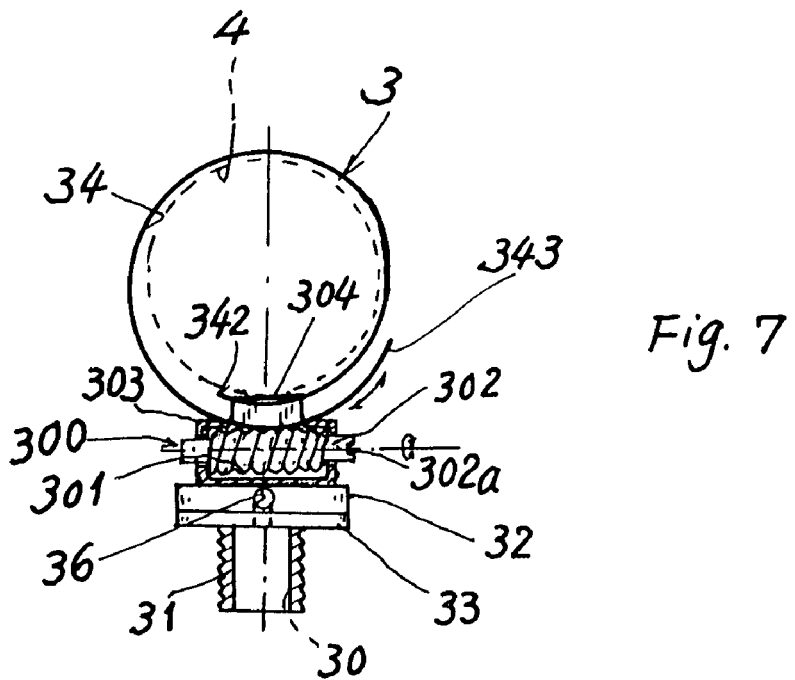
FIG. 7 is a sectional drawing of further preferred embodiment of the sensor holder of the present invention.
Figure 8:
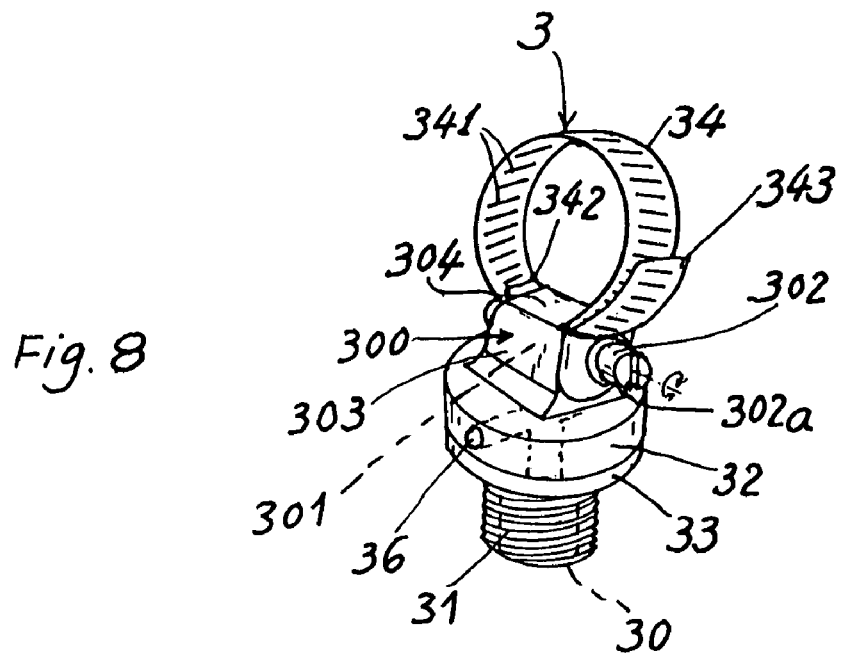
FIG. 8 is a perspective view of the sensor holder of FIG. 7.

As shown in FIGS. 7 and 8, another preferred embodiment of the sensor holder 3 includes: a male-threaded screw portion 31 having an inflating hole 30 formed through the screw portion 31 and engaged with the female-threaded hole 13 formed in the inflation valve 1 for securing the sensor holder 3 to an inside wall of the wheel rim 5 within a tire 6, a nut 32 circumferentially formed with the screw portion 31 to be retained on the inside wall of the wheel rim 5 as packed by a packing member 33, a fastening ring 34 formed in an adjusting device 300 formed on the nut 32 for adjustably fastening a tire pressure sensor 4 having variable diameters or size, and an air opening 36 formed through the nut 32 and communicated with the inflating hole 30 and the inflation valve 1 for directing air from the inflation valve 1 into the tire for sensing tire pressure by the sensor 4.

The adjusting device 300 includes: a worm gear (or screw) 301 formed on a bolt 302 rotatably mounted in a sleeve 303 formed on the nut 32, a driving portion 302a such as a slot recessed in the bolt 302 to be driven by a driver for rotating the bolt and worm gear 301 which is engaged with a plurality of teeth (or slots) 341 formed lengthwise on the fastening ring 34, with the fastening ring 34 having a fixed end 342 fixed on a top wall 304 of the sleeve 303 and having a free end 343 opposite to the fixed end 342, whereby upon rotation of the bolt and worm gear 301, the fastening ring 34 will be driven by the worm gear 31 for shrinking or expanding the diameter of the fastening ring 34 in order to match the diameter of the tire pressure sensor 4 for firmly gripping the fastening ring 34.

I claim:

1. A vehicle protection device comprising: an inflation valve mounted on a wheel rim of a tire; a wiper externally mounted on the wheel rim as fastened by the inflation valve; and a sensor holder engaged with the inflation valve and positioned inside the wheel rim for holding a tire pressure sensor within the wheel rim and within the tire; whereby the sensor will sense the tire pressure for safely monitoring the tire pressure; and the wiper will scrape the rain water outwardly from the wheel rim for enhancing driving safety; and
said inflation valve including: a connector having a female-threaded hole formed in the connector, a packing sleeve jacketed on the connector and fixed in a connector hole formed through the wheel rim for firmly mounting the connector in the wheel rim, and a retainer disk circumferentially integrally formed on the connector for fastening the wiper on the wheel rim; said wiper including: a base having a through hole formed in the base and engaged with the packing sleeve of the inflation valve to be fastened to the wheel rim by the retainer disk to firmly retain the wiper on the wheel rim, a scraper protruding from the base towards an axis of the wheel rim for scraping rain water or snow accumulated in an annular groove as recessed in the wheel rim, and a taper portion tapered outwardly from the scraper for thrusting the water outwardly from the wheel rim for enhancing driving safety; and
said sensor holder including: a male-threaded screw portion having an inflating hole longitudinally formed through the screw portion and engaged with said female-threaded hole formed in the inflation valve for securing the sensor holder to an inside wall of the wheel rim within the tire, a nut circumferentially formed with the screw portion to be retained on the inside wall of the wheel rim as packed by a packing member, a fastening ring integrally formed on the nut for fastening a sensor holding portion of the tire pressure sensor, and an air opening formed through the fastening ring and fluidically communicated with the inflating hole and communicated with the inflation valve for directing air from the inflation valve into an interior in the tire and within the wheel rim for sensing the tire pressure by the sensor.

2. A vehicle protection device according to claim 1, wherein said inflation valve further includes a hollow retainer engaged with the inflation valve and positioned inside the wheel rim when the sensor holder is dismantled.

3. A vehicle protection device according to claim 1, wherein said sensor holder is directly secured to the inflation valve when said wiper is dismantled.

4. A vehicle protection device comprising:
an inflation valve mounted on a wheel rim of a tire; a wiper externally mounted on the wheel rim as fastened by the inflation valve; and a sensor holder engaged with the inflation valve and positioned inside the wheel rim for holding a tire pressure sensor within the wheel rim and within the tire; whereby the sensor will sense the tire pressure for safely monitoring the tire pressure; and the wiper will scrape the rain water outwardly from the wheel rim for enhancing driving safety; and said sensor holder including: a nut having a female-threaded hole formed in the nut to be engaged with a male-threaded connector of the inflation valve, a packing member packed in between the nut of the sensor holder and an inside wall of the wheel rim when the nut is engaged with the connector of the inflation valve, a fastening ring integrally formed with the nut for fastening a tire pressure sensor in the fastening ring, and an air port recessed in the fastening ring and fluidically communicated with the inflation valve for directing air into an interior in the tire and in the wheel rim for sensing tire pressure by the sensor.

5. A vehicle protection device according to claim 4, wherein a male-threaded packing sleeve is integrally formed on the male-threaded connector of the inflation valve for firmly engaging the female-threaded hole formed in the nut of the sensor holder.

6. A vehicle protection device according to claim 4, wherein said sensor holder further includes a set screw provided in the fastening ring for firmly dogging the male-threaded connector of the inflation valve.

7. A vehicle protection device comprising: an inflation valve mounted on a wheel rim of a tire; a wiper externally mounted on the wheel rim as fastened by the inflation valve; and a sensor holder engaged with the inflation valve and positioned inside the wheel rim for holding a tire pressure sensor within the wheel rim and within the tire; whereby the sensor will sense the tire pressure for safely monitoring the tire pressure; and the wiper will scrape the rain water outwardly from the wheel rim for enhancing driving safety; and said sensor holder including: a male-threaded screw portion having an inflating hole formed through the screw portion and engaged with a female-threaded hole formed in the inflation valve for securing the sensor holder to an inside wall of the wheel rim within the tire, a nut circumferentially formed with the screw portion to be retained on the inside wall of the wheel rim as packed by a packing member, a fastening ring formed in an adjusting device formed on the nut for adjustably fastening a tire pressure sensor having variable diameters or size, and an air opening formed through the nut and communicated with the inflating hole and the inflation valve for directing air from the inflation valve into the tire for sensing tire pressure by the sensor.

8. A vehicle protection device according to claim 7, wherein said adjusting device includes: a worm gear formed on a bolt rotatably mounted in a sleeve formed on the nut, a driving portion recessed in the bolt to be driven by a driver for rotating the bolt and worm gear which is engaged with a plurality of teeth formed lengthwise on the fastening ring, with the fastening ring having a fixed end fixed on a top wall of the sleeve and having a free end opposite to the fixed end, whereby upon rotation of the bolt and worm gear, the fastening ring will be driven by the worm gear for shrinking or expanding the diameter of the fastening ring in order to match the diameter of the tire pressure sensor for firmly gripping the fastening ring.

* * * * *